(12) United States Patent
Swanson

(10) Patent No.: US 11,530,108 B1
(45) Date of Patent: Dec. 20, 2022

(54) BUNGEE SPOOL

(71) Applicant: James F. C. Swanson, Eagan, MN (US)

(72) Inventor: James F. C. Swanson, Eagan, MN (US)

(*) Notice: Subject to any disclaimer, the term of this patent is extended or adjusted under 35 U.S.C. 154(b) by 153 days.

(21) Appl. No.: 17/164,682

(22) Filed: Feb. 1, 2021

(51) Int. Cl.
*B65H 75/14* (2006.01)
*B65H 75/28* (2006.01)
*B60R 11/06* (2006.01)

(52) U.S. Cl.
CPC ............. *B65H 75/14* (2013.01); *B65H 75/28* (2013.01); *B60R 11/06* (2013.01); *B65H 2701/39* (2013.01)

(58) Field of Classification Search
CPC ....... B65H 75/14; B65H 75/28; B60P 7/0846; B60P 7/0869; B60R 11/06
See application file for complete search history.

(56) References Cited

U.S. PATENT DOCUMENTS

| 2,767,936 | A | | 10/1956 | Hubbard et al. |
|---|---|---|---|---|
| 3,635,421 | A | | 1/1972 | Boland et al. |
| 4,453,843 | A | | 6/1984 | Martyniuk |
| 4,542,862 | A | | 9/1985 | Romike et al. |
| 4,917,323 | A | | 4/1990 | Wing |
| 5,265,822 | A | * | 11/1993 | Shober, Jr. ............. B65H 75/22 242/388.2 |
| 7,383,959 | B1 | * | 6/2008 | Rudd ........................ A47F 7/00 211/13.1 |
| 8,480,023 | B2 | | 7/2013 | Penumatcha et al. |
| D714,618 | S | | 10/2014 | Zalzalah |
| 9,333,926 | B1 | * | 5/2016 | Henning ................. B60R 11/06 |
| 9,345,346 | B1 | * | 5/2016 | O'Flaherty ............ B65H 75/36 |
| 2012/0085771 | A1 | * | 4/2012 | O'Flaherty ........... B60P 7/0846 220/676 |
| 2015/0283935 | A1 | * | 10/2015 | Marinelli .............. B60P 7/0846 211/61 |

FOREIGN PATENT DOCUMENTS

FR            3036547 A1 * 11/2016 ............. B65H 75/14

* cited by examiner

*Primary Examiner* — William E Dondero
(74) *Attorney, Agent, or Firm* — Berggren Law Offices, LLC

(57) ABSTRACT

A bungee spool for collecting and storing bungee cords in a portable manner comprising a core and two rims where at least one has multiple slots radiating and the slots have raised inner edges outward from the point where the rim joins the top of the cylinder.

20 Claims, 5 Drawing Sheets

BUNGEE SPOOL

FIELD OF THE INVENTION

This invention relates to a spool for storing bungee cords.

BACKGROUND OF THE INVENTION

Bungee cords are a handy tie-down device. Many people use then for many varied application s including, for example, to secure loads on their vehicles such as, for example automobiles or utility vehicles, or attach tarps to stationary supports.

Bungee cords elastic articles that comprise an attaching portion and an elastic portion. They generally come in the form of a toggle bungee cord and a hook bungee cord. A toggle bungee cord, commonly used in Europe, has a spherical end as an attaching portion and an elastic cord, as an elastic portion, with two ends that both attach to the spherical end to form aa loop at the opposite end or a looped elastic cord. The two elastic cords are stretched around a group of things that are to be bundled and the loop is placed around the spherical end. A hook bungee cord, commonly used in the US, is an elastic cord, as the elastic portion, with a hook, as an attaching portion attached to each end of the cord. In one use, the elastic cord is stretched around a group of things that are to be bundled and the two hooks are engaged. In another use, one hook is attached to a fixed object, the elastic cord is stretched over something to be confined, and the other hook is attached to another fixed object. In still another use, one hook is attached a fixed object such as a car bumper, a large item is placed in a car trunk preventing the car trunk lid from closing, the cord is stretched and the trunk lid is lowered, and the other hook is attached to the trunk lid to hold the trunk lid down to keep the object within the car trunk. Uses of bungee cords, particularly the hook bungee cords are varied.

The elastic portions of bungee cords come in two forms, a rubber sheathed cord and a multiple elastic strand assembly encased in a sheath, loomed fabric or other casing. Each will lose its elasticity under too much tension for too long of a time. Generally, stretching while stored should be less than 30%.

The chief drawback with bungee cords is that they become tangled in storage. The hook ends, especially, catch on anything and everything. Untangling them before using them is a common experience.

The is a need for a storage device to store bungee cords that is portable permits one to store bungee cords neatly, securely, and easily with a stretch during storage of no more than 30% while keeping bungee cords easily accessible and the elastic portions managed properly to minimize degradation of their elasticity.

SUMMARY OF THE INVENTION

I have invented bungee spool for collecting and storing bungee cords in a portable uncluttered manner. Bungee cords are in two forms, a toggle ball form and a hook form.

The invention has two aspects, an article aspect and a method of using aspect. The article aspect comprises a bungee spool for collecting at least one toggle bungee cord with a spherical end attached to two ends of an elastic cord to form a looped elastic cord or a hook bungee cord with a first hook and a second hook each secured to each end of an elastic cord by an area having a bulge with a thickness at each end of an elastic cord, the bungee spool that comprises three elements, a cylinder a left rim and a right rim. The cylinder has an outside diameter, an inside diameter, a thickness, an outer surface, a length, a center axis, and a left side edge with an outside and an inside and a right-side edge with an outside and an inside. The left rim has a circular shape with an outer circumference having an outer edge, an inner circumference, a center, an outside surface in an outside plane, an inside surface attached to the cylinder left side edge such that the center is on the cylinder center axis and the left rim extends radially outward to the outer edge. The left rim also has multiple radial slots extending from the point of contact between the outside of the cylinder left side edge and the inside of the left rim to the outer left edge. The slots have a bottom, a greater space between adjacent slots around the outer circumference that is the same, a lesser space between adjacent slots around a rim circumference encompassing the slot bottoms that is the same wherein at least the lesser space is configured to minimize the stretch of at least one elastic cord with a length of 12 inches to no more than 30 percent, and each slot has a top that is open, a depth, a width configured to be less than the ball end of the toggle bungee cord, a lead edge, and a trailing edge. The right rim has a circular shape with an outer circumference having an outer edge, an inner circumference, a center, an outside surface in an outside plane, an inside surface attached to the cylinder right side edge such that the center is on the cylinder center axis, and the right rim extends radially outward to the outer edge.

The method of using aspect is for using a bungee spool for collecting at least one bungee cord with a spherical end attached to two ends of an elastic cord to form an elastic loop or a bungee cord with a first hook and a second hook each secured to each end of an elastic cord by an area having a bulge with a thickness at each end of an elastic cord. The method of using has two independent embodiments that each provide at least one different type of bungee cord and each comprise five steps.

For the first embodiment, one step is to provide at least one bungee cord with a first hook and a second hook each secured to each end of an elastic cord by an area having a bulge with a thickness at each end of an elastic cord. Another step is to provide a bungee spool as described above comprising at least a first slot and a second lot. Still another step is to insert the first hook about the lead edge of the first slot with the cord resting on the outer surface of the cylinder. Another step is to wind the elastic cord around the outer surface of the cylinder. Still another step is to insert the second hook about a trailing edge of a second slot that is the nearest forward slot to cause some stretching on the elastic cord.

For the second embodiment, one step is to provide at least one bungee cord with a spherical end attached to two ends of an elastic cord to form a looped elastic cord with an end. Another step is to provide a bungee spool as described above comprising at least a first slot, a second slot and a third slot. Still another step is to insert the spherical end of the toggle bungee cord in the first slot with the looped elastic cord resting on the outer surface of the cylinder. Another step is to wind the looped elastic cord around the outer surface of the cylinder. Still another step is to insert the looped elastic cord around the rim between the second slot that is the nearest forward slot and the third slot that is before the second slot to cause some stretching on the looped elastic cord.

The benefits of the invention are many. Bungee cords may now be collected and stored in a neat, secure, and easy manner in a portable device. The bungee spool will permit isolation and long-term retention of the hook ends to prevent tangling of the hook ends with other hook and cords of other bungee cords or other items altogether. The desired effect is to store them neatly, securely, and easily. The means to do this will isolate and retain the hook ends. The invention allows for management of the elastic mid-section securely and without excessive long-term stretching that may adversely transfer memory to the elastic cords and reduce their elasticity and shorten their useful life. The invention may be used to store bungee cords with different lengths of elastic portions and different attaching portions at the same time. Embodiments also may have properties that include portability, ease of manufacture, and affordability.

The previously mentioned features and advantages will become apparent from the following detailed description of illustrative embodiments thereof, which is to be read in connection with the accompanying drawings.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

Figure 1:
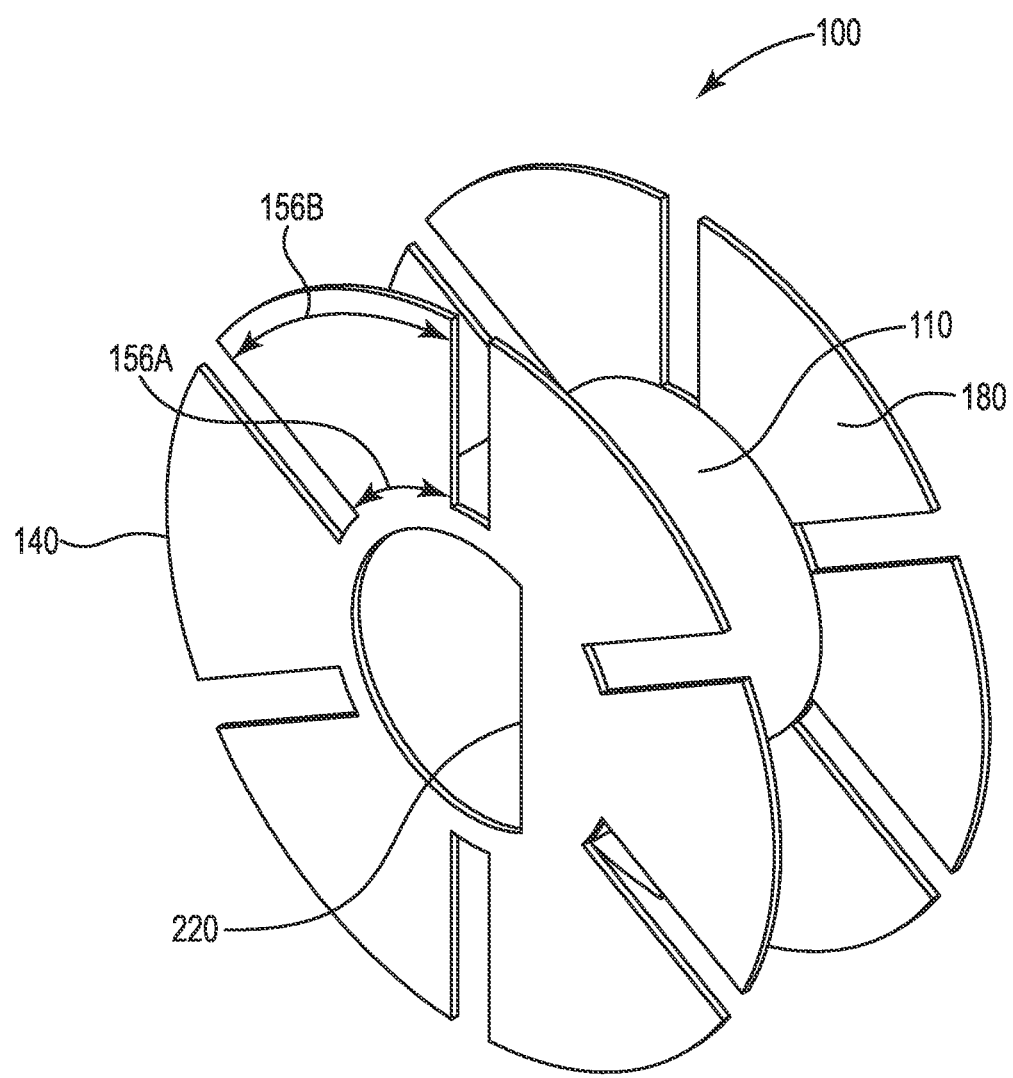
FIG. 1. is a perspective drawing of one embodiment of the invention.

While the invention is amenable to various modifications and alternative forms, specifics thereof have been shown by way of example in the drawings and will be described in detail below. It is to be understood, however, that the intention is not to limit the invention to the embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

Bungee cords are devices often used to hold things together. Bungee cords comprise an attaching portion and an elastic portion. One form of bungee cord is a toggle bungee cord. The attaching portion is a sphere, and the elastic portion is an elastic cord with two ends both attached to the ball and the middle of the elastic cord forming a loop. The elastic portion is stretched around a collection of things and the loop is placed over the ball to form a closed form securely containing the collection when released.

Another form of bungee cord is hook bungee cord. The attaching portion is composed of two hooks and the elastic portion is an elastic cord that is attached to one hook at each end. The hook bungee cords have some kind of "winding" or "bulge" that secures the hook to the elastic cord. The elastic portion has a length with a may vary in length from 12 inches to over 5 feet and elasticity from being easy to pull by an adult person to being hard to pull depending on the application. This form of bungee cord is more versatile and the method of fastening the elastic cord ends to the hooks may vary in appearance. Some uses include (1) tie a collection of objects together, (2) hold objects together, such as a car trunk lid and base when the trunk is too full to let the lid fasten normally to the base, and (3) fasten a tarp edge with grommets to supports with eye-rings.

The elastic portion of each can be either an elastic rubber span or a multiple elastic strand assembly encased in a sheath, loomed fabric or other casing. It generally has a memory that prevents it from returning to its original unstretched length if stored in too much of a stretched position for too long of a time. This causes the elasticity of the elastic portion to become less elastic over time and lose its usefulness. The less stretched the elastic is for a time, the better and depends on the elastic used. Generally, elastic should not be stored in a stretched state that is 30% beyond its original length for more than a month. Elasticity is minimally reduced over a time if the stretched state is less than 20% for more than a month. Little adverse change in useful life span is seen if the stretch is less than 10% for more than a month.

The hook bungee cord is more versatile than the toggle bungee cord but more easily tangled during storage. As previously stated, the chief drawback with bungee cords is that they become tangled in storage. The hook ends, especially, catch on anything and everything. Untangling them before using them is a common experience. There is a need to easily store these bungee cords in one please, such that they store with little if any loss of useful life in an untangled and compact state. There is also a need to be able to store hook bungee cords of various lengths and toggle bungee cords with the hook bungee cords to keep all together and easy to find.

Figure 2:
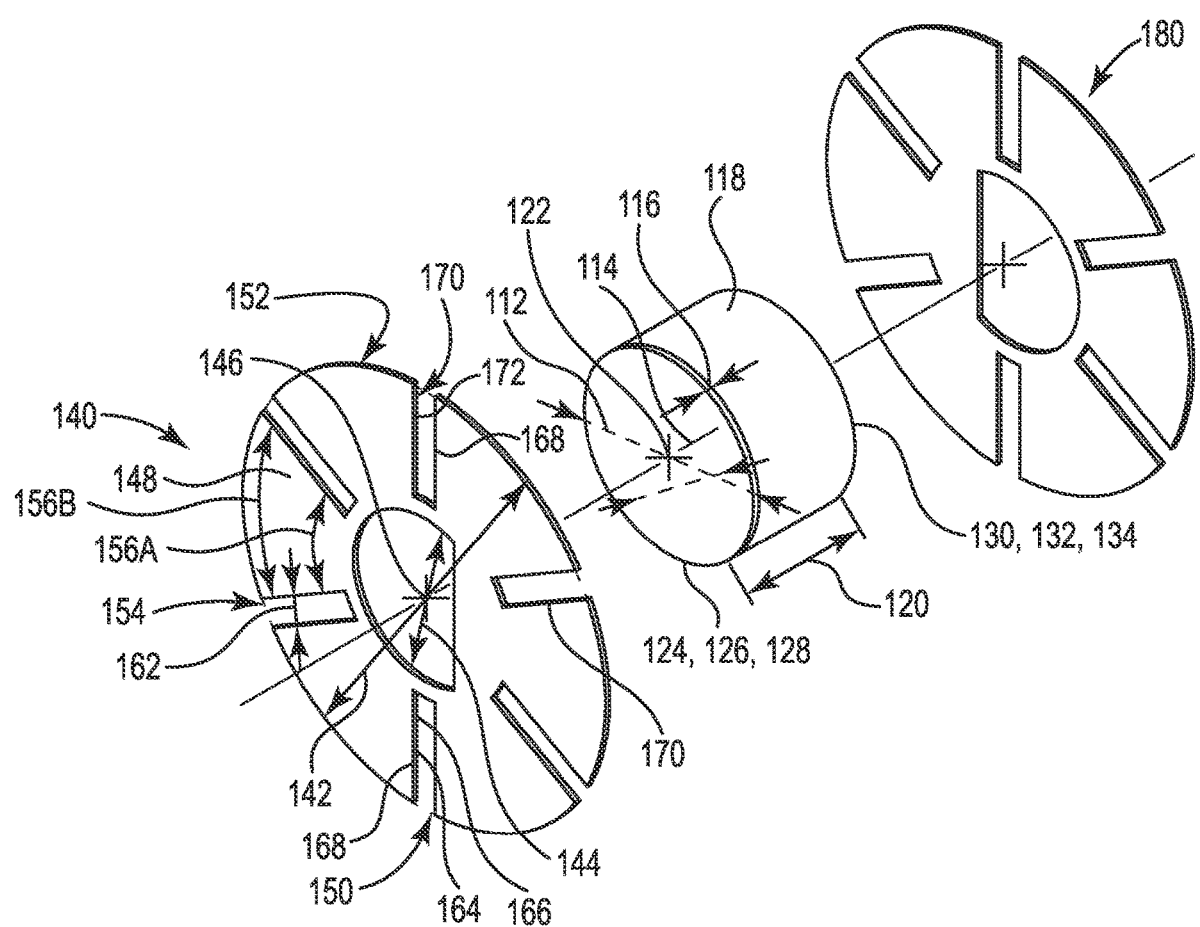
FIG. 2. is an exploded vies of the embodiment shown in FIG. 1.

The invention solves the problem of tangling hook bungee cords forgetting where they are. The Bungee Spool is just such a fixture that may also be used to store toggle bungee cords in the same device. It is roughly spool-shaped, hence the name. It has no moving parts. The article aspect of the invention comprises a cylinder and two rims. The rims are located on each end of the cylinder, longitudinally as shown in FIG. 1. Although the exploded view in FIG. 2 shows three pieces; it could be manufactured as one piece, or even two pieces that are joined.

The bungee spool is portable. This means that the bungee spool weight less than 10 pounds when empty and less than 40 pounds when full and may be carried by one hand by an adult person. Some embodiments of the empty bungee spool may weigh less than 8 pounds, some less than 6 pounds, and some less than 4 pounds. Some embodiments of the bungee spool when full may weigh less than 35 pounds, 30 pounds, 25 pounds, 20 pounds, 15 pounds, and 10 pounds.

Specifically, the article aspect comprises a bungee spool for collecting at least one toggle bungee cord with a spherical end attached to two ends of an elastic cord to form an elastic loop or a hook bungee cord with a first hook and a second hook each secured to each end of an elastic cord by an area having a bulge with a thickness at each end of an elastic cord, the bungee spool that comprises three elements, a cylinder a left rim and a right rim.

The cylinder has an outside diameter, an inside diameter, a thickness, an outer surface, a length, a center axis, and a left side edge with an outside and an inside and a right-side edge with an outside and an inside. The cylinder has an outside diameter large enough to not fill the bungee spool too quickly and small enough to remain portable and easy to carry when the bungee spool is filled with stored bungee cords. A cylinder diameter that is too small is not as practical as the elastic cord must be wound around it many more revolutions. There are some hook bungee cords with a longer than average hook end that does not bend or wind that smoothly around cylinder diameters that work well for hook bungee cords with normal hooks. They will wind well on larger diameter cylinders such as those with diameters of over flinches. Some embodiments may have an outside cylinder diameter more than 5 inches, some more than 6 inches, and some more that 7 inches. Some cylinder embodiments may have an outside diameter of less than 13 inches, some less than 11 inches, some less than 9 inches.

The cylinder has an inner diameter small enough to enough to provide the cylinder with a thickness large enough to provide sturdy support for the bungee cords during storage for over a month and small enough to provide weight for the bungee spool to still be portable and easy to carry. Cylinder thicknesses may range from less than 0.125 inch to over 0.25 inch depending on the material used. Some cylinder embodiments may be solid to provide further support. In this case, the cylinder may be filled with foam material to minimize cylinder weight.

The length of the cylinder is short enough to accommodate at least several bungee cords of varying lengths and long enough to become undesirably less portable and be physically bulky. In some embodiments, the length is at least 2 inches, in some at least 3 inches and in some at least 4 inches. In some embodiments the length is no more than 6 inches, some 5 inches, and some 4 inches.

The left and right side of the cylinder are configured to be attached to the left and right rim.

The left rim has a circular shape with an outer circumference having an outer edge, an inner circumference, a center, an outside surface in an outside plane, an inside surface attached to the cylinder left side edge such that the center is on the cylinder center axis and the left rim extends radially outward to the outer edge. The left rim also has multiple radial slots extending from the point of contact between the outside of the cylinder left side edge and the inside of the left rim to the outer left edge. The slots have a bottom, a greater space around the outer circumference that is the same between adjacent slots, a lesser space around rim encompassing the slot bottoms that is the same between adjacent slots wherein at least the lesser space is configured to minimize the stretch of at least one elastic cord with a length of 12 inches to no more than 30 percent, and each slot has a top that is open, a depth, a width configured to be less than the ball end of the toggle bungee cord, a lead edge with an inside with a thickness that is more than the thickness of the left rim and an outside flush with the outside surface of the left rim, and a trailing edge with an inside with a thickness that is more than the thickness of the left rim and an outside.

In some embodiments, the inside surface of the left rim is parallel to the outside surface of the left rim. Thus, the thickness of the lead and trailing edges of less importance than other dimensions.

The dimensions of the rim that are most important are (1) the spacing between adjacent slots to permit storing of bungee cords without adversely affecting their useable elastic life, and (2) the slot depth. The diameter of the rim is less relevant than these two dimensions, only needing to be large enough to store a few bungee cords and small enough to maintain portability of the bungee spool. In some embodiments, the length is at least 9 inches, 10 inches, and 11 inches. In some embodiments of the diameter is less than 18 inches, less than 16 inches, and less than 14 inches. Similarly, the thickness of the lead and training slot edges is less relevant. In this invention, the thicknesses of the lead slot edge and the trailing slot edge is the same as the thickness of the left rim between slots. The edges may have rounded edges for ease of handling the apparatus.

The outer circumference and the rim circumference encompassing the slot bottoms, also called the slot bottom circumference, have lengths that determine the number of slots needed to keep stored bungee cords satisfactorily elastic. Generally elastic portions of bungee cords begin to retain some memory when stretched above 30% for an extended period such as 1 month or longer. They become noticeably less elastic and less able to perform as bungee cords. As mentioned above, this value is less than 30%, better less than 20% and best less than 10%. For a bungee cord with a length of 12 inches, this maximum desirable stretch corresponds to less than 3.6 inches, 2.4 inches, and 1.2 inches, respectively. For a bungee cord with a length of 18 inches, this maximum desirable stretch corresponds to less than 5.4 inches, 3.6 inches, and 1.8 inches. For slots that project outward radially, the adjacent spaces along the outer circumference are always greater that the space along the inner circumference. Thus, if spacing is configured to keep the stretch of all bungee cords with lengths of at least 12 inches to less than 30%, the spacing separation along the slot bottom circumference must be less than 3.6 inches. The effect of cylinder diameter, inner and outer circumference of the rim, and number of radial slots is illustrated in the following two examples.

Desired spacing may be achieved by changing those variables to achieve desired stretching during storage to preserve elasticity. In the first example, the outer cylinder diameter is 6 inches, and the outer rim diameter is 9 inches. Thus, the outer cylinder circumference, the same as the slot bottom circumference, is 18.8 inches and the outer rim circumference is 28.3 inches. Six slots evenly spaced radially about the rim result in a spacing that ranges from 3.1 inches at the slot bottom, also called herein as a lesser space, to 4.7 inches at the slot top, also called herein as a greater space. Since 3.6 inches, the distance to stretch 12 inches 30%, is between the minimum and maximum spacing values, this construction would work for storing all bungee cords of at least a length of 12 inches with less than 30% stretch.

In the second example, the outer cylinder diameter is 8 inches, and the outer rim diameter is 12 inches. Thus, the outer cylinder circumference, the same as the slot bottom circumference, is 25.1 inches and the outer rim circumference is 37.7 inches. Eight slots evenly spaced radially about the rim result in a spacing that ranges from 3.1 inches at the slot bottom to 4.7 inches at the slot top. Since 3.6 inches, the distance to stretch 12 inches 30%, is between the minimum and maximum spacing values, this construction would work for storing all bungee cords of at least a length of 12 inches with less than 30% stretch. Similar calculations may be done to determine bungee spool dimensions for minimum lengths of bungee cords and degree of elastic stretch desired to be stored.

The second important dimension is the depth of the slot. This controls how many bungee cords may be stored on a bungee spool and remain portable. The depth should be enough for the bungee spool to store several bungee cords of various lengths. The depth should not be too large that the bungee spool becomes physically cumbersome and not conveniently portable. Some embodiments have a slot depth of at least 1 inch and at least 2 inches. Some embodiments have a slot depth of no more than 6 inches, some no more than 5 inches, some no more than 4 inches.

The right rim has a circular shape with an outer circumference having an outer edge, an inner circumference, a center, an outside surface in an outside plane, an inside surface attached to the cylinder right side edge such that the center is on the cylinder center axis, and the right rim extends radially outward to the outer edge. In some embodiments, the right rim may have similar features as the left rim. In some embodiments the features are mirror images. In other embodiments, they are not. In these embodiments, the inside surface of the right rim is parallel to the outside surface of the right rim. Also, the right rim may have slots like those of the left rim. In some embodiments, the slot spacing between adjacent slots is the same within that rim but different from that of the left rim. Such a configuration may permit storage of hook bungee cords of different lengths on each side.

In some embodiments there is a handle built into the center of at least one rim for ease-of-use of carrying the bungee spool. In some embodiments, the handle is built into the center of each rim. In some embodiments, the handle comprises the filling of part of the inner diameter of the rim with material similar in thickness to the rim material, Some cylinder embodiments may have the exposed edge of the insert rounded for comfort. Some cylinder embodiments may be solid to provide further support. In this case, the cylinder may be filled with foam material to minimize cylinder weight.

The bungee spool may be made with conventional known manufacturing techniques and materials. Materials may be the same or different for the components of the bungee spool, the cylinder and each rim. Materials include, for example but not limited to high density polyethylene, poly vinyl chloride, aluminum or even wood.

The Bungee Spool works for every size, type and shape of bungee cord I have found, even the toggle-ball type with spherical ends and twin parallel elastic cords. It holds several bungees at once. It is easy to use. It is effective. The compact size means it is portable. If used as directed, it is durable. It also has the capacity of being mass produced cheaply. The bungee spool may be better understood by viewing some figures illustrating some embodiments of the invention.

FIG. 1. is a perspective drawing of one embodiment of the invention. Shown is a bungee spool (100) with a cylinder (110), a left rim (140), a right rim (180) and a handle (220). Each slot has a greater space between adjacent slots (156A) a lesser space between adjacent slots (156B), FIG. 2. is an exploded vies of the embodiment shown in FIG. 1. Also shown are some features of cylinder 110. Specifically, the features are an outside diameter (112), an inside diameter (114), a thickness (116), an outer surface (118), a length (120), and a center (122). A right-side edge (130), a right-side edge outside (132), and a right-side edge inside (134) are shown as one line and not broken apart because of the scale of rh drawing. A left side edge (124), a left side edge outside (126), and a left side edge inside (128) are shown also as one line and not broken apart because of the scale of the drawing. Similarly, some features of left rim 140 are shown. Specifically, these features are an outer circumference (142), an inner circumference (144), a center (146), an outside surface (148), an outside plane (150) that includes outside surface 148, an inside surface (152), and six slots (154). Each slot has greater space between adjacent slots 156A, lesser space between adjacent slots 156B, a top (158), a depth (160), a width (162), a leading edge (164), a leading edge inside (166) that is thicker than the left rim thickness that is distance between left rim inside 148 and left rim outside 152, a leading edge outside (168), a trailing edge (170), and a trailing edge inside (172). A trailing edge outside (174) is not identified here but is in FIG. 6. Similar features are shown for right edge 180 but not marked. The embodiment shown in this figure shows the slots equally depicted in number, spacing, and type of slot edge configuration for both the left rim and right rim. These features may change between the left rim and the right rim or be absent in the right rim in other embodiments not shown as long as the bungee spool is suitable for storing bungee cords.

Figure 3:
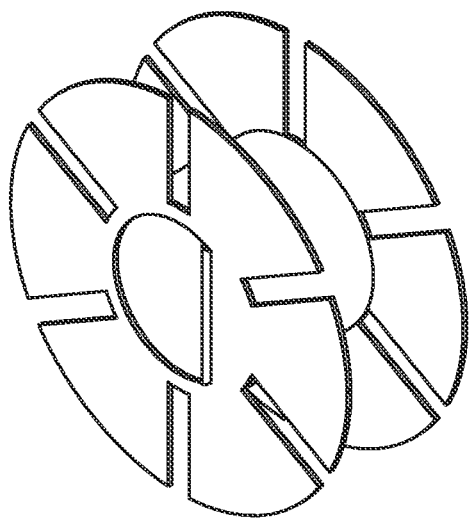
FIG. 3 is a perspective drawing of another embodiment of the invention with a rounded handle edge.

FIG. 3 is a perspective drawing of another embodiment of the invention with a rounded handle edge. This is like FIG. 1 except handle 220 has a rounded edge 222.

Figure 4:
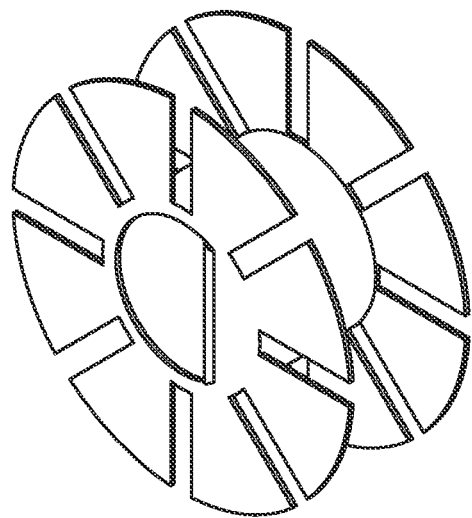
FIG. 4 is a perspective drawing of an embodiment of the invention with greater separation between the two rims.

FIG. 4 is a perspective drawing of an embodiment of the invention with greater separation between the two rims. This is shown with a cylinder with a length that is greater than the cylinder shown in FIG. 3.

Figure 5:
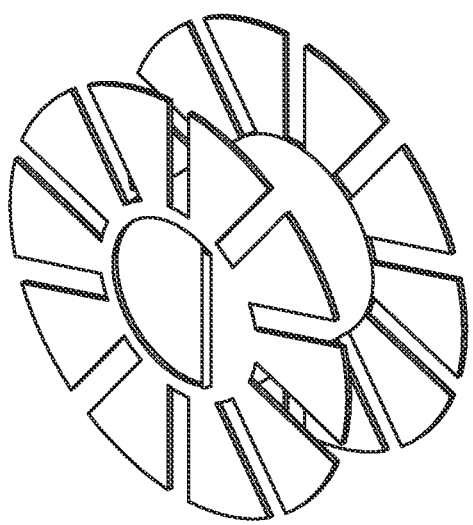
FIG. 5. is a perspective drawing of one embodiment of the invention with a greater number of slots on each rim.

FIG. 5. is a perspective drawing of one embodiment of the invention with a greater number of slots on each rim. Slot spacing between adjacent slots is less than slot spacing shown in FIG. 3 and FIG. 4. However, if cylinder outside diameter 112 were wee larger, slot spacing would be more. As discussed above, slot spacing affects storage life of bungee cords.

Figure 6:
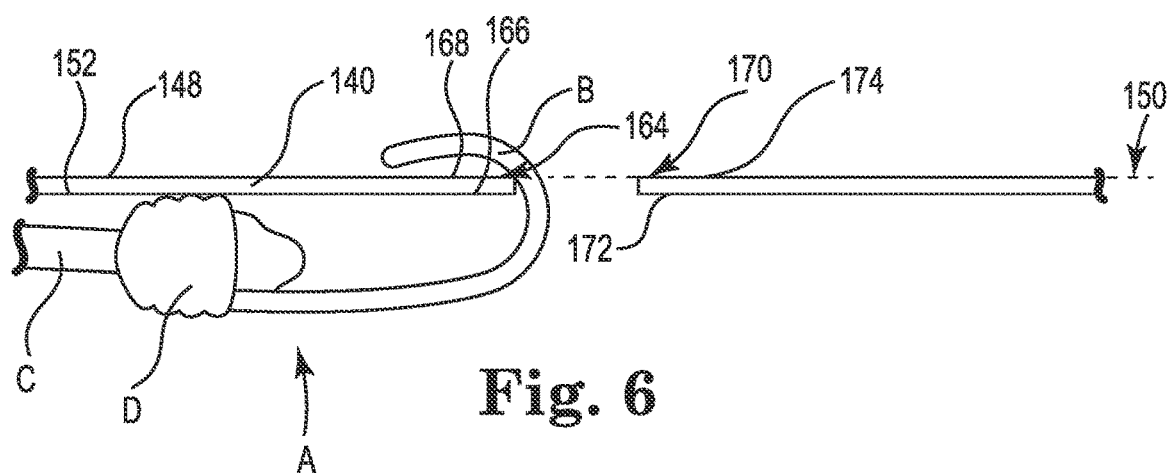
FIG. 6 is a top view of a bungee cord with a hook and bulge releasably affixed to a thicker inner edge of a slot of the embodiment shown in FIG. 1.

FIG. 6 is a top view of a bungee cord with a hook and bulge releasably affixed to leading edge 168 of a slot of the embodiment shown in FIG. 1. Shown is the hook bungee cord (A) with a hook (B) fastened to an elastic cord (C) with a bulge (D). Hook B is placed around slot leading edge 164 with outer edge 168 and inner edge 166.

Figure 7:
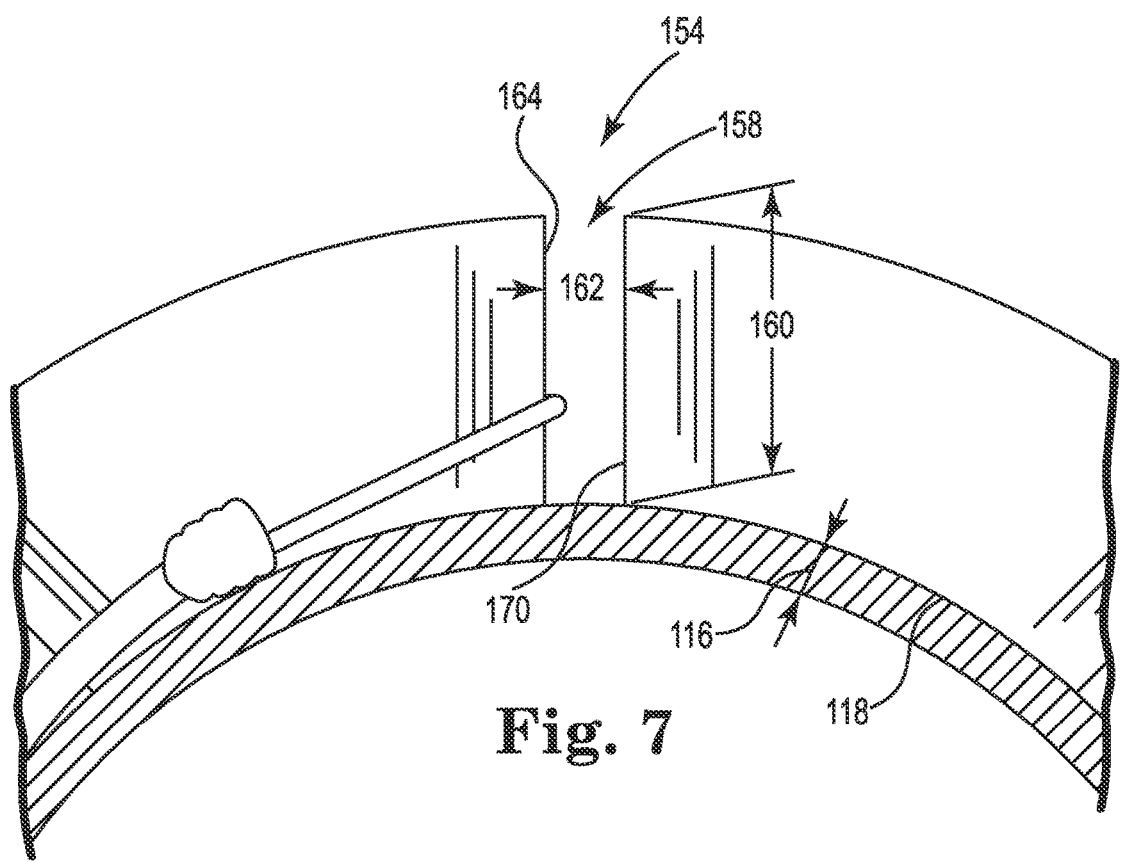
FIG. 7 is a side perspective view of the inside of the invention in FIG. 6 showing the elastic cord lying flat on het cylinder with space for the bulge.

FIG. 7 is a side perspective view of the inside of the invention in FIG. 6 showing the elastic cord lying on the cylinder. Shown is slot 154, its top 158, depth 160, width 162 lead edge 164, and trailing edge 170. Also shown is where the left side edge of the cylinder joins the left inside surface of the left rim. The cylinder outside surface 118 is flush with the bottom of the slot in the rim. The cylinder thickness 116 is shown.

Figure 8:
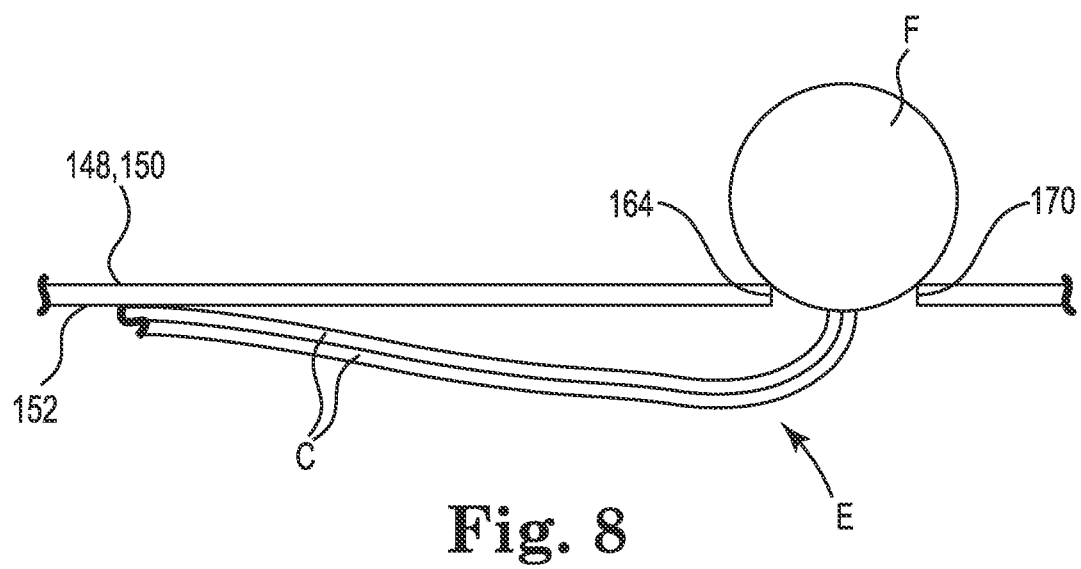
FIG. 8 is a top view of a toggle bungee cord with a spherical ball releasably affixed to a thicker inner edge of a slot of the embodiment shown in FIG. 6.

FIG. 8 is a top view of a toggle bungee cord with a spherical ball releasably affixed to an edge of a slot of the embodiment shown in FIG. 6. The looped elastic cord is shown laying on the cylinder outer surfaced before the cord is stretched slightly as the loop end is laced around the trailing edge of the next slot that provides some tension to the looped elastic cord and the one just behind that one.

These figures illustrate the ability of the bungee spool to store a wide variety of bungee cords used today in the same storage device or one of similar construction.

The method of using aspect is for using a bungee spool for collecting at least one bungee cord with a spherical end attached to two ends of an elastic cord to form an elastic loop or a bungee cord with a first hook and a second hook each secured to each end of an elastic cord by an area having a bulge with a thickness at each end of an elastic cord. The method of using has two independent aspects that each provide at least one different type of bungee cord and each comprise five steps.

For the first aspect, one step is to provide at least one bungee cord with a first hook and a second hook each secured to each end of an elastic cord by an area having a bulge with a thickness at each end of an elastic cord. Another step is to provide a bungee spool as described above with multiple slots comprising at least a first slot and a second clot. Still another step is to insert one hook in a slot with the cord resting on the outer surface of the cylinder. Another step is to wind the cord around the outer surface of the cylinder. Still another step is to insert the other hook into the nearest forward slot to cause some stretching on the cord.

Regarding storage conditions, it depends on the bungee cords being stored. Elastic portions that are elastic fibers encompassed with woven fabric are relatively insensitive to the effects of temperature on the life of their elasticity. Thus, their elastic life is relatively unaffected by temperatures below 0 degrees F. and above 100 degrees F. Elastic portions that are bands of elastic material such as rubber, are sensitive to temperature. These elastic portions are unsatisfactorily degraded if stored inn temperatures that are too cold or too hot. They become brittle and break if too cold and lose memory if too hot.

For some embodiments, the method further comprises the step of removing the bungee cord from the bungee spool by removing the second hook about the trailing edge and the first hook about the leading edge when desired.

For some embodiments, the right rim has similar multitude of slots as the left rim. The spacing may be similar or different and the number of clots may be similar or different as discussed above.

In some embodiments, wherein the left rim has at least a first slot, a second slot, and a third slot, the method includes storing a second type of bungee cord, the toggle bungee cord with a spherical end attached to two ends of an elastic cord to form a looped elastic cord with an end. This embodiment further comprises additional steps one additional step is to insert the spherical end of the toggle bungee cord in the first slot with the looped elastic cord resting on the outer surface of the cylinder. Another additional step is to wind the looped elastic cord around the outer surface of the cylinder. Still another additional step is to insert the end of the looped elastic cord around the rim between the second slot that is the nearest forward slot to cause some stretching on the cord and the third slot that is before the second slot.

This last embodiment may further comprise the additional step to remove the bungee cord from the bungee spool by removing the looped elastic cord from the second slot and third slot and removing the spherical ball from the first slot when desired.

For the second aspect, one step is to provide at least one bungee cord with a spherical end attached to two ends of an elastic cord to form a looped elastic cord with an end. Another step is to provide a bungee spool as described above comprising at least a first slot, a second slot and a third slot. Still another step is to insert the spherical end of the toggle bungee cord in the first slot with the looped elastic cord resting on the outer surface of the cylinder. Another step is to wind the looped elastic cord around the outer surface of the cylinder. Still another step is to insert the end of the looped elastic cord around the rim between the second slot that is the nearest forward slot and the third slot that is before the second slot to cause some stretching on the looped elastic cord.

In some embodiments of this aspect, the method further comprises the step of removing the bungee cord from the bungee spool by removing the looped elastic cord from the second slot and third slot and removing the spherical ball from the first slot when desired.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

I claim:

1. A bungee spool for collecting at least one toggle bungee cord with a spherical end attached to two ends of an elastic cord to form a looped elastic cord or a hook bungee cord with a first hook and a second hook each secured to each end of an elastic cord by an area having a bulge with a thickness at each end of an elastic cord, the bungee spool comprising,
a cylinder having an outside diameter, an inside diameter, a thickness, an outer surface, a length, a center axis, and a left side edge with an outside and an inside and a right-side edge with an outside and an inside;
a left rim having a circular shape with an outer circumference having an outer edge, an inner circumference, a center, an outside surface in an outside plane, an inside surface attached to the cylinder left side edge such that the center is on the cylinder center axis and the left rim extends radially outward to the outer edge, and having multiple radial slots extending from the point of contact between the outside of the cylinder left side edge and the inside of the left rim to the outer left edge, the slots having a bottom, a greater space around the outer circumference that is the same between adjacent slots, a lesser space around a rim circumference encompassing the slot bottoms that is the same between adjacent slots wherein at least the lesser space is configured to minimize the stretch of at least one elastic cord with a length of 12 inches to no more than 30 percent, and each slot has a top that is open, a depth, a width configured to be less than the ball end of the toggle bungee cord, a lead edge, and a trailing edge; and
a right rim having a circular shape with an outer circumference having an outer edge, an inner circumference, a center, an outside surface in an outside plane, an inside surface attached to the cylinder right side edge such that the center is on the cylinder center axis, and the right rim extends radially outward to the outer edge.

2. The bungee spool of claim 1 wherein the cylinder is hollow.

3. The bungee spool of claim 2 wherein the inner circumference of the rim is partial filled to form an interior edge configured to permit easy grasping and carrying.

4. The bungee spool of claim 3, wherein the interior edge is rounded to configure it for comfort while lifting and carrying.

5. The bungee spool of claim 1 wherein the inside surface of the left rim is parallel to the outside surface of the left rim, the inside surface of the right rim is parallel to the outside surface of the right rim and the right rim further having multiple radial slots extending from the point of contact between the outside of the right side edge of the cylinder and the inside of the right rim to the outer edge of the right rim, the slots having a bottom, a space around the outer circumference that is the same between adjacent slots, a lesser space around a rim circumference encompassing the slot bottoms that is the same between adjacent slots wherein at least the lesser space is configured to minimize the stretch of at least one elastic cord with a length of 12 inches to no more than 30 percent, and each slot has a top that is open, a depth, a width configured to be less than the ball end of the toggle bungee cord, a lead edge, and a trailing edge.

6. The bungee spool of claim 1 wherein the greater space between the multiple slots of the left rim is configured to minimize the stretch of at least one elastic cord with a length of 12 inches to no more than 30 percent.

7. The bungee spool of claim 6 wherein the lead edge and trailing edge of each slot of the left rim is flush with the outside surface of the left rim.

8. The bungee spool of claim 6 wherein the slot lead edges and trailing edge on the left rim are configured to have thickness of less than the thickness of the bulge of the bungee cord.

9. The bungee spool of claim 8 wherein the slot lead edge inside and trailing edge inside on the left rim has a perpendicular cross-section that is shaped with an outer edge contacting the outside plane of the left rim and a circumference in contact with the hook of the at least two slots to align the hook while the bungee cord is stored to be in an elongated position of minimal stress.

10. The bungee spool of claim 6 wherein the slot lead edge inside and trailing edge inside on the left rim have a perpendicular cross-section that is oval with an outer edge contacting the outside plane of the left rim.

11. The bungee spool of claim 1 wherein the lesser space between the multiple slots of the left rim is configured to minimize the stretch of at least one elastic cord with a length of 12 inches to no more than 20 percent.

12. The bungee spool of claim 1 wherein the lesser space between the multiple slots of the left rim is configured to minimize the stretch of at least one elastic cord with a length of 12 inches to no more than 10 percent.

13. The bungee spool of claim 1 wherein the inner circumference of the rim is partial filled to form an edge configured to permit easy grasping and carrying.

14. A method of using the bungee spool for collecting at least one toggle bungee cord with a spherical end attached to two ends of an elastic cord to form an elastic loop with an end or a bungee cord with a first hook and a second hook each secured at each end of an elastic cord by an area having a bulge with a thickness at each end of an elastic cord, the bungee spool, comprising the steps of,
   providing at least one bungee cord with a first hook and a second hook each secured to each end of an elastic cord by an area having a bulge with a thickness at each end of an elastic cord, the bungee spool;
   providing a bungee spool comprising
      a cylinder having an outside diameter, an inside diameter, a thickness, an outer surface, a length, a center axis, and a left side edge with an outside and an inside and a right-side edge with an outside and an inside;
      a left rim having a circular shape with an outer circumference having an outer edge, an inner circumference, a center, an outside surface in an outside plane, an inside surface attached to the cylinder left side edge such that the center is on the cylinder center axis and the left rim extends radially outward to the outer edge, and having multiple radial slots extending from the point of contact between the outside of the cylinder left side edge and the inside of the left rim to the outer left edge, the slots having a bottom, a greater space around the outer circumference that is the same between adjacent slots, a lesser space around rim encompassing the slot bottoms that is the same between adjacent slots wherein at least the lesser space is configured to minimize the stretch of at least one elastic cord with a length of 12 inches to no more than 30 percent, and each slot has a top that is open, a depth, a width configured to be less than the ball end of the toggle bungee cord, a lead edge, and a trailing edge;
      a right rim having a circular shape with an outer circumference having an outer edge, an inner circumference, a center, an outside surface in an outside plane, an inside surface attached to the cylinder right side edge such that the center is on the cylinder center axis, and the right rim extends radially outward to the outer edge;
   inserting the first hook about the lead edge of the first slot with the cord resting on the outer surface of the cylinder;
   winding the cord around the outer surface of the cylinder; and
   inserting the second hook about a trailing edge of a second slot that is the nearest forward slot to cause some stretching on the cord.

15. A method of claim 14 further comprising the step of, removing the bungee cord from the bungee spool by removing the second hook about the trailing edge and the first hook about the leading edge when desired.

16. A method of claim 14 wherein the inside surface of the left rim is parallel to the outside surface of the left rim, the inside surface of the right rim is parallel to the outside surface of the right rim and the right rim further having multiple radial slots extending from the point of contact between the outside of the right side edge of the cylinder and the inside of the right rim to the outer edge of the right rim, the slots having a bottom, a space around the outer circumference that is the same between adjacent slots, a lesser space around a rim circumference encompassing the slot bottoms that is the same between adjacent slots wherein at least the lesser space is configured to minimize the stretch of at least one elastic cord with a length of 12 inches to no more than 30 percent, and each slot has a top that is open, a depth, a width configured to be less than the ball end of the toggle bungee cord, a lead edge, and a trailing edge.

17. A method of claim 14 wherein the left rim has at least a first slot, a second slot, and a third slot, and the method further comprising the steps of,
   providing at least one toggle bungee cord with a spherical end attached to two ends of an elastic cord to form a looped elastic cord with an end,
   inserting the spherical end of the toggle bungee cord in the first slot with the looped elastic cord resting on the outer surface of the cylinder;
   winding the looped elastic cord around the outer surface of the cylinder; and
   inserting the looped elastic cord around the rim between the second slot that is the nearest forward slot and the third slot that is before the second slot to cause some stretching on the looped elastic cord.

18. A method of claim 17 further comprising the step of, removing the bungee cord from the bungee spool by removing the looped elastic cord from the second slot and third slot and removing the spherical ball from the first slot when desired.

19. A method of using the bungee spool for collecting at least one toggle bungee cord with a spherical end attached to two ends of an elastic cord to form an elastic loop or a bungee cord with a first hook and a second hook each secured to each end of an elastic cord by an area having a bulge with a thickness at each end of an elastic cord, the bungee spool, comprising the steps of, providing at least one toggle bungee cord with a spherical end attached to two ends of an elastic cord to form a looped elastic cord with an end;

providing a bungee spool comprising a cylinder having an outside diameter, an inside diameter, a thickness, an outer surface, a length, a center axis, and a left side edge with an outside and an inside and a right-side edge with an outside and an inside;

a left rim having a circular shape with an outer circumference having an outer edge, an inner circumference, a center, an outside surface in an outside plane, an inside surface attached to the cylinder left side edge such that the center is on the cylinder center axis and the left rim extends radially outward to the outer edge, and having multiple radial slots extending from the point of contact between the outside of the cylinder left side edge and the inside of the left rim to the outer left edge, the slots having a bottom, a greater space around the outer circumference that is the same between adjacent slots, a lesser space around rim encompassing the slot bottoms that is the same between adjacent slots wherein at least the lesser space is configured to minimize the stretch of at least one elastic cord with a length of 12 inches to no more than 30 percent, and each slot has a top that is open, a depth, a width configured to be less than the ball end of the toggle bungee cord, a lead edge, and a trailing edge; and a right rim having a circular shape with an outer circumference having an outer edge, an inner circumference, a center, an outside surface in an outside plane, an inside surface attached to the cylinder right side edge such that the center is on the cylinder center axis, and the right rim extends radially outward to the outer edge;

inserting the spherical end of the toggle bungee cord in the first slot with the looped elastic cord resting on the outer surface of the cylinder;

winding the looped elastic cord around the outer surface of the cylinder; and inserting the looped elastic cord around the rim between the second slot that is the nearest forward slot and the third slot that is before the second slot to cause some stretching on the looped elastic cord.

20. A method of claim 19 further comprising the step of, removing the bungee cord from the bungee spool by removing the looped elastic cord from the second slot and third slot and removing the spherical ball from the first slot when desired.

\* \* \* \* \*